Figure 1:
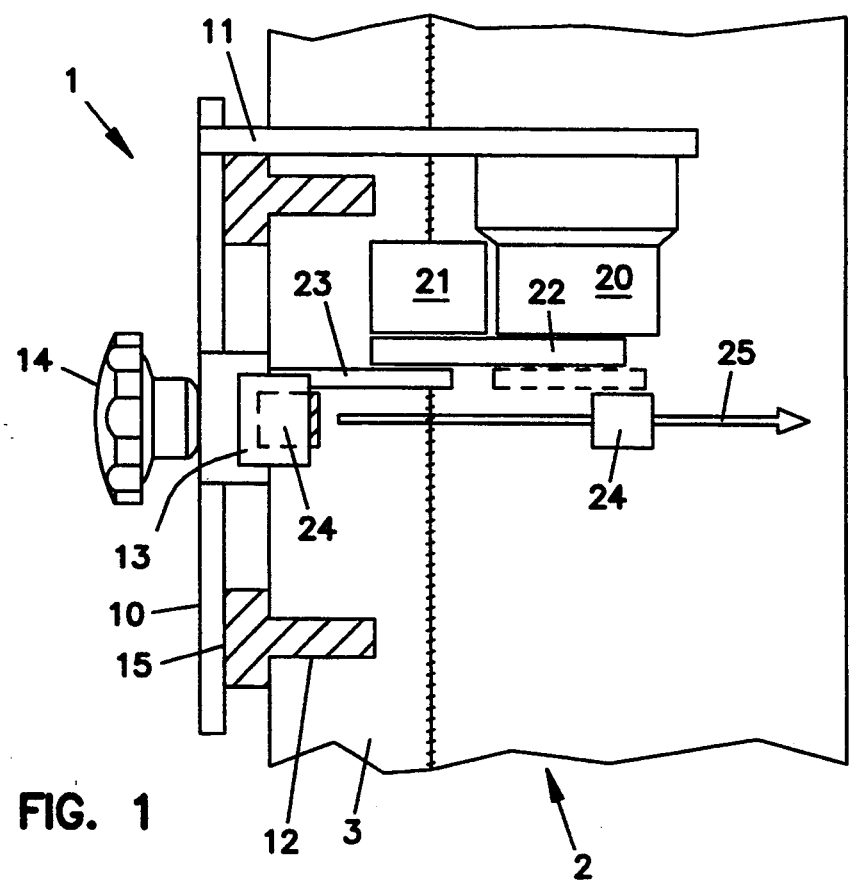

United States Patent [19]
Gronskov

[11] Patent Number: 5,351,411
[45] Date of Patent: Oct. 4, 1994

[54] APPARATUS FOR THE SCANNING OF A PROFILE AND USE HEREOF

[76] Inventor: Leif Gronskov, Kirkebjerg Allé 95, 1.tv, Brondby, Denmark, DK-2605

[21] Appl. No.: 94,120
[22] PCT Filed: Jan. 27, 1992
[86] PCT No.: PCT/DK92/00028
 § 371 Date: Jul. 23, 1993
 § 102(e) Date: Jul. 23, 1993
[87] PCT Pub. No.: WO92/14120
 PCT Pub. Date: Aug. 20, 1992

[30] Foreign Application Priority Data
Jan. 30, 1991 [DK] Denmark .................. 167/91

[51] Int. Cl.$^5$ ............................. G01B 5/20
[52] U.S. Cl. ........................ 33/551; 33/1 Q; 33/DIG. 1; 73/146
[58] Field of Search ........... 33/1 Q, 287, 551, 553, 33/554, 651, 651.1, DIG. 1; 73/146

[56] References Cited

U.S. PATENT DOCUMENTS

| | | | |
|---|---|---|---|
| 4,407,072 | 10/1983 | Hoskins, Jr. | 73/146 |
| 4,417,466 | 11/1983 | Panetti | 73/146 |
| 4,502,224 | 3/1985 | Davies | 33/DIG. 1 |
| 4,625,412 | 12/1986 | Bradshaw | 33/551 |
| 4,674,194 | 6/1987 | Riley | 33/1 Q |
| 5,036,594 | 8/1991 | Kesler et al. | 33/1 Q |

FOREIGN PATENT DOCUMENTS

| | | |
|---|---|---|
| 0155084 | 9/1985 | European Pat. Off. |
| 0252164 | 1/1988 | European Pat. Off. |
| 2087561 | 5/1982 | United Kingdom . |
| 2183840 | 6/1987 | United Kingdom . |

Primary Examiner—William A. Cuchlinski, Jr.
Assistant Examiner—G. Bradley Bennett
Attorney, Agent, or Firm—Merchant & Gould, Smith, Edell, Welter & Schmidt

[57] ABSTRACT

An apparatus (1) for the scanning of a profile, e.g. the cross-sectional profile of a train wheel (2,3), comprises a stationary part (11) which supports a first arm (22) and a second arm (23), the ends of said arms being coupled together by means of angle-encoding joints (20,21). One of the arms (23) comprises a free end with a measuring wheel (24) which is arranged to be moved in contact with the profile which is to be scanned.

Both of the Joints (20,21) are electronic angle encoders which are coupled to a portable computer via an interface circuit.

8 Claims, 5 Drawing Sheets

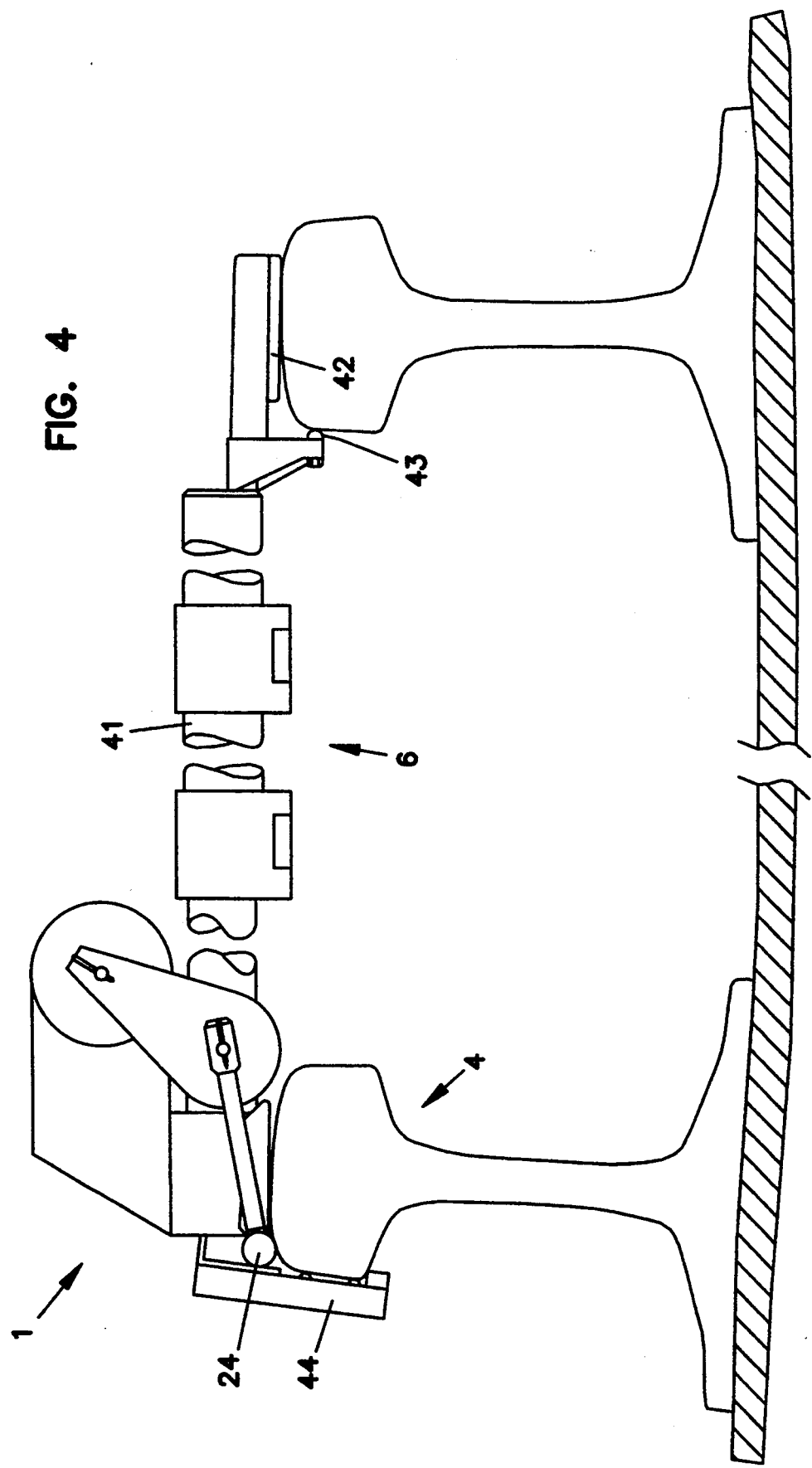

APPARATUS FOR THE SCANNING OF A PROFILE AND USE HEREOF

BACKGROUND OF THE INVENTION

The invention relates to an apparatus for the scanning of a profile.

The scanning of a profile, e.g. a cross-sectional profile of an article, has many practical applications, and is therefore used within many technical areas, e.g. in connection with production control, the measurement of wear and the like.

The present invention has been developed for the measuring of the cross-sectional profile of train wheels and rails, and is thus described in connection herewith, even though it will be obvious to those familiar with the art that the apparatus according to the invention can be used for the scanning of surfaces or profiles on many other articles and items.

In the operation of railways, the cross-sectional profiles of the wheels and the rails are of great importance for a train's vehicular dynamics, and herewith for the train's security, comfort and operational economy. During operation, the wheels and rails become worn, which results in increased risk of breakage and derailments, accelerated wear and a reduction in the running characteristics of the wheels. Worn wheels and rails result in increased dynamic forces during operation, a reduction in comfort and a further acceleration of the wear. By regular investigation of wheels and rails, especially their cross-sectional profiles, there can be established a systematic and condition-determined maintenance, and the operational costs are considerably reduced. However, a large part of the maintenance of rolling stock still takes place on the basis of measurement of operating time and operational distance, rather than on a systematic supervision of conditions.

It is known to measure the cross-sectional profile of an article, for example a train wheel, cf. e.g. European patent application no. 0.252,164 or German publication no. 3.637.839. These known apparatus are complicated and timeconsuming to use, in that they must be mounted firmly on or at the wheel while a measurement of the wheel profile is carried out, and it is particularly complicated to calculate the result of the measurement and evaluate how the machining and the renovation of the wheel is to be implemented. Consequently, many of the known types of apparatus are arranged for workshop use, i.e. when the relevant railway carriage has already been taken out of operation.

From European patent application no. 0.155,084 it is known to scan or measure the profile of a three-dimensional article with an apparatus which is configured substantially as disclosed in the preamble to claim 1. However, this apparatus can only measure convex surfaces and curves due to the configuration of the scanning probe, and because the electronic circuit associated with the apparatus is not arranged herefor.

ADVANTAGES OF THE INVENTION

With the measuring apparatus according to the invention, it is possible to scan and measure surfaces on all sides of an article, i.e. it is also possible to scan an article's "underside" or an article which has areas which are concave. It is possible, for example, to scan the downwardlyfacing surfaces on a rail in connection with the scanning of the rail's profile, and thus obtain a total picture of the degree to which a rail is worn. With the characterizing features as disclosed, the apparatus according to the invention has the great advantage that a profile can be scanned very quickly, e.g. the profile of the running surface of a train wheel or the top profile of a rail. The apparatus will normally be configured as a small, portable unit with which the scanning can be carried out "in situ" on the carriage wheel, i.e. wherever this may be desired, merely providing that there is access to the wheel.

The apparatus is simply placed on or by the article of which the profile is to be measured, after which the scanning arm of the apparatus is manually led over and in contact with the profile during continuous scanning of the positions of the angle-measuring joints.

The coupling together of the electronic angle encoders with a computer, e.g. a small, portable computer, has the result that after a wheel profile has been scanned, an immediate answer is obtained to the question concerning the degree to which the profile lies within or exceeds acceptable limits. A further advantage is that all the measuring results can be stored in the computer, e.g. on a diskette, and the information can be transferred to a central EDP plant which controls the maintenance, or can be used for the direct control of an automatic machine tool, e.g. an automatic lathe for the machining of wheels.

By configuring the apparatus according to the invention as disclosed, security is provided that it is always in correct contact with the item of which the profile is to be scanned when this is of material which can be magnetized, which is the case with railway wheels and rails herefor.

By configuring the apparatus according to the invention as disclosed and characterized, the positioning of the apparatus is simplified when the article to be measured is of material which can be magnetized, e.g. when it is a railway wheel or a similar article of iron.

If the apparatus according to the invention is configured as disclosed, the apparatus can quickly be moved from wheel to wheel without the use of tools and without unnecessary waste of time.

If the apparatus according to the invention is configured as disclosed, the measurement or the scanning of the profile is carried out more quickly and more precisely, and the possibility is provided of comparing the results with standard profiles fed into the computer.

As mentioned above, the apparatus has been developed for use in the scanning of profiles as disclosed, but can be used without any alterations in principle for the measurement of the profiles or surface contours of other articles. It has shown, however, that the invention according to the application is very suitable for the uses particularly described, the reason being that here the time consumed in carrying out the control measurements can be considerably reduced, so that the apparatus according to the invention can, for example, be used in the condition-determined maintenance of railway material.

THE DRAWING

Figure 2:
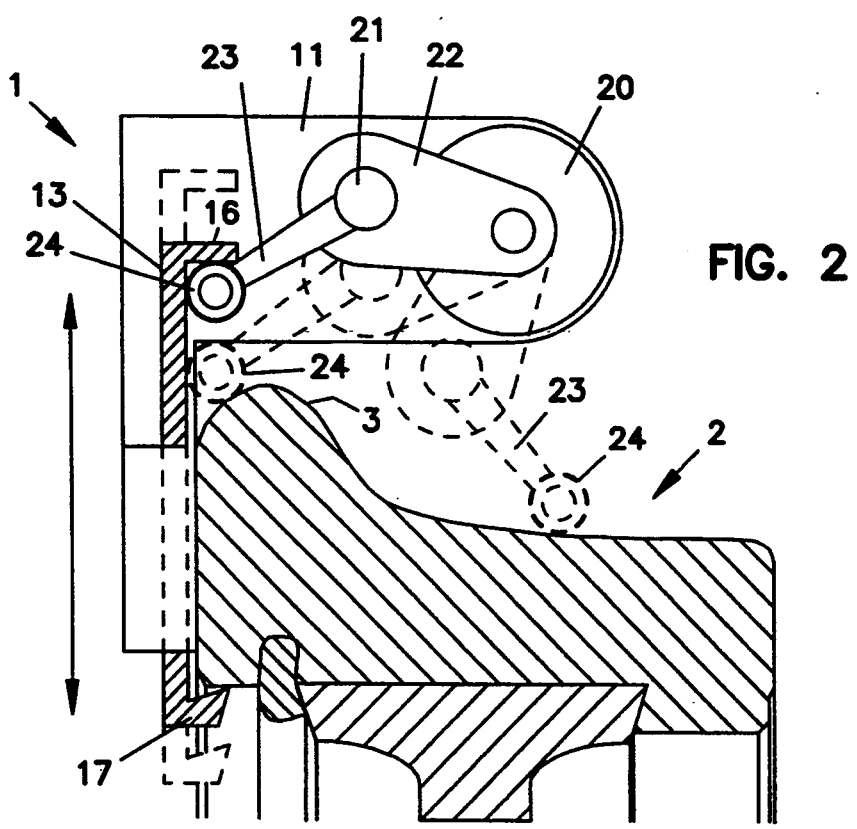
Figure 3:
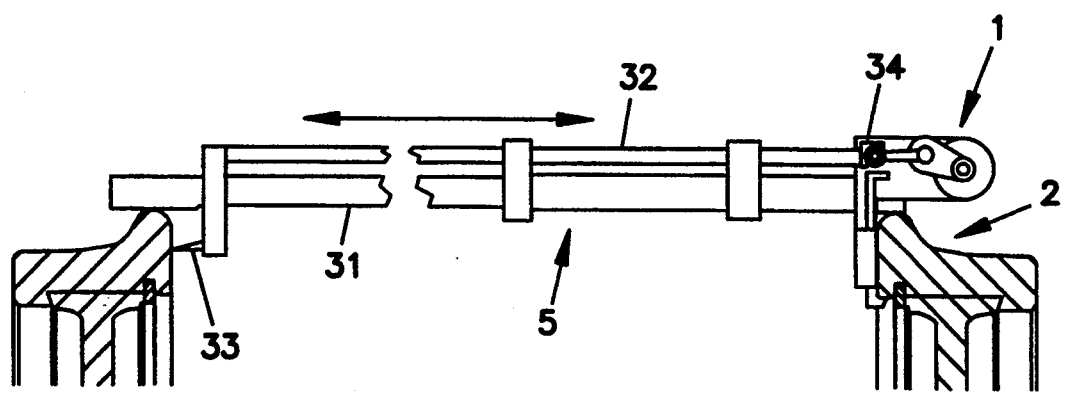
Figure 7:
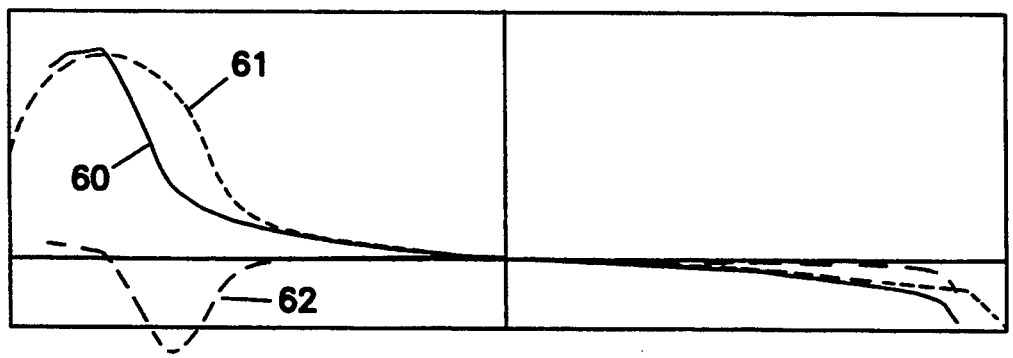
Figure 5:
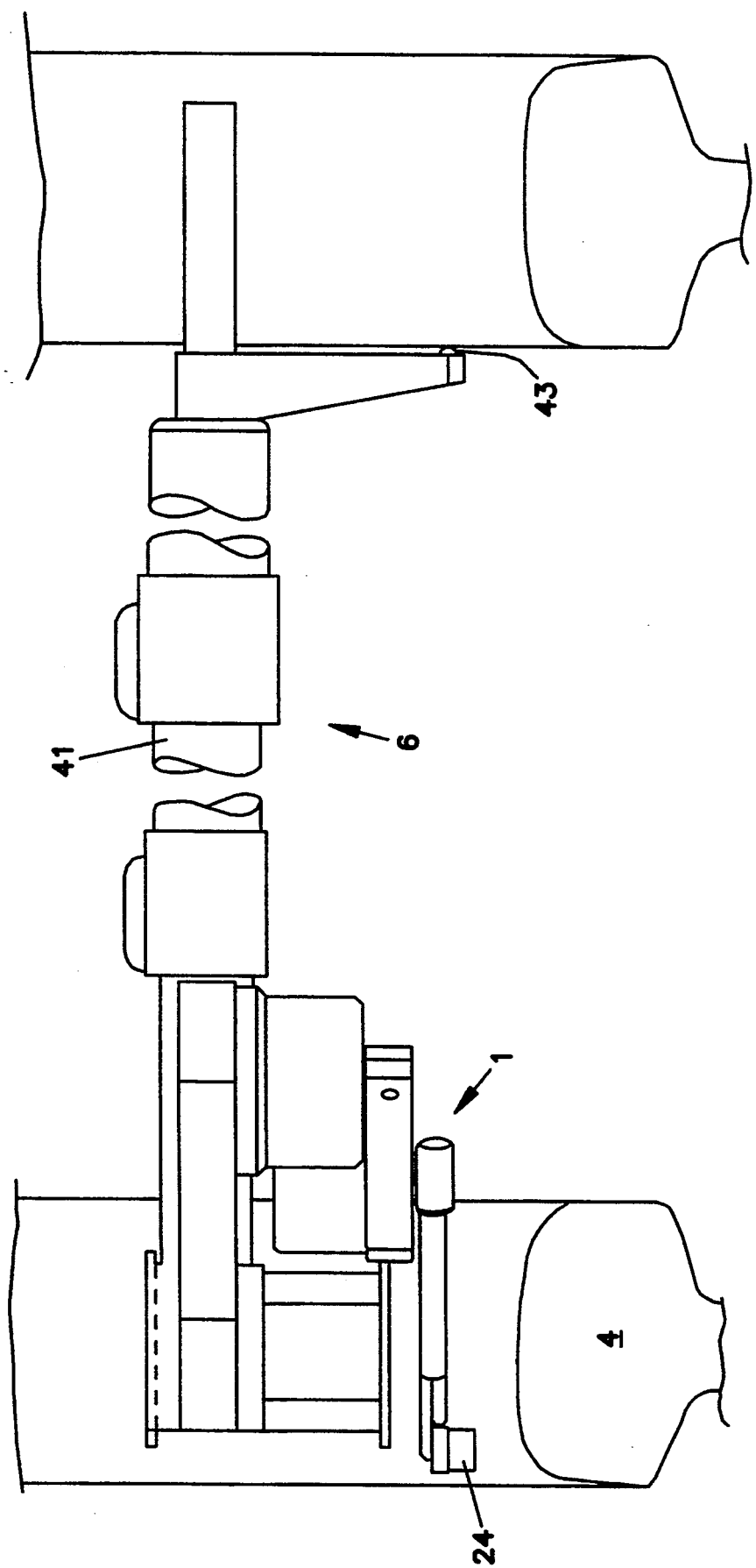
Figure 6:
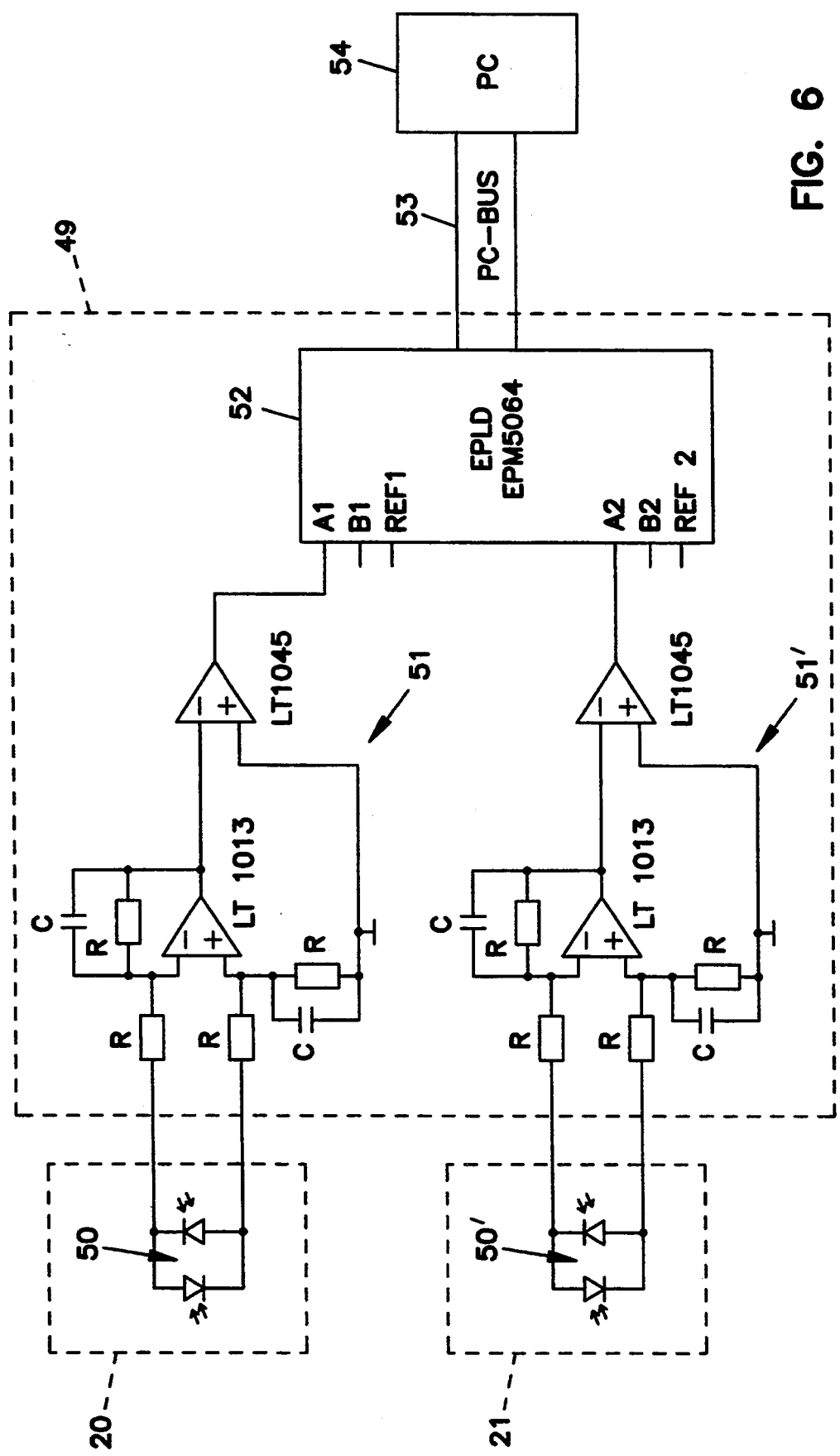

The invention will now be described in more detail with reference to a preferred embodiment of the invention, in that FIG. 1 shows the scanning apparatus seen from above and during the measurement of a railway wheel, FIG. 2 shows the same apparatus as in FIG. 1, but seen partly from the side and partly in section, FIG. 3 shows a measuring setup during the use of a pin gauge fixture, FIG. 4 shows the use of the measuring apparatus according to the invention during the scanning of a rail profile, FIG. 5 shows the same as FIG. 4, but seen from above, FIG. 6 shows a block diagram of the electronic circuit of the measuring apparatus, and FIG. 7 shows a screen picture of a measuring and calculation result for a train wheel.

DESCRIPTION OF AN EXAMPLE EMBODIMENT

In that reference is made to FIGS. 1, 2 and 6, the following describes the principle of the apparatus 1 according to the invention in connection with the scanning of the cross-sectional profile of the running surface on a train wheel 2 with a normal, rounded wheel flange 3.

The apparatus 1 comprises a stationary part 10, e.g. a rigid, solid iron or metal part, upon which is fixedly supported a right-angled and similarly stationary part 11 on which the movable scanning system itself is mounted.

The stationary part 10 includes, for example, permanent magnets 15 which can secure the stationary part 10 solidly and unmovably on the inner side of the wheel. For the positioning of the stationary part in relation to the top of the flange 3, the stationary part includes one or more supporting elements, e.g. tubes or cylinders 12, which extend at right-angles out from the stationary part, see FIG. 1. The stationary part is positioned in relation to the wheel by placing it in such a manner that the supporting elements 12 rest against the highest point of the wheel flange 3, see FIG. 1.

The stationary part 10 also comprises an element or measuring gauge 13 arranged in a sliding manner in the radial direction of the wheel 2, and which by means of screws or the like and a handle 14 can be moved, cf. FIG. 2. The upper part 16 which, for example, is at right-angles to the radial part 13, see also FIG. 2, constitutes a starting point for the measurement of the ring thickness, in that the lower end of the measuring gauge has an upwardly inclined gauge point 17 arranged to abut against the inner side of the wheel ring, see FIG. 2. Between the point 17 and the upper part 16 there is a predetermined distance which is fed into the computer, cf. later.

The movable scanning system comprises a first angle-encoding joint 20 mounted firmly and solidly on the stationary part 11, see FIG. 1. On the output shaft of the first angle-encoding joint 20 there is disposed a first arm 22. In the free end of this arm there is a further angle-encoding joint 21, on the output shaft of which there is disposed a second arm 23. In the free end of the second arm 23 there is a roller or a wheel 24 which is arranged to pass over and in contact with the profile which is to be scanned. The movable parts can be moved in a predetermined plane which will normally lie at right-angles to that surface whose profile is to be scanned; in the shown example at right-angles (radially) to the wheel, and comprising the axis of the wheel so that the roller 24 can follow the track shown with the arrow 25 in FIG. 1. The roller or the wheel 24 can be made of permanently magnetic material, thus ensuring contact with the profile if this is of iron or other material which can be magnetized. The two angle-encoding joints 20,21 can, for example, be Incremental Rotary Encoders, type Minirod 450, manufactured by Heidenhain, Germany, or similar electronic angle encoders.

The angle encoders can be identical, but other angle encoders can also be used with different measuring accuracy, depending on the length of the arms.

The output signals from the two angle encoders are fed to a computer via an interface circuit 51,51',52, which is explained in connection with FIG. 6 of the drawing.

Each of the two angle encoders 20,21 comprises light-sensitive diodes 50,50' which are illuminated by a notshown light source placed in each angle encoder. The output signals from the diodes in the angle encoder are fed to each their interface circuit 51,51', where the signals from the angle encoders are amplified and suitably adjusted and fed to a common circuit 52, a so-called EPLD (Erasable Programmable Logic Device) of the type EPM 5064, from where an absolute angle measurement for the angular displacement of each angle encoder, expressed as digital signal values, are fed to the databus 53 of the computer 54 which, for example, is a so-called PC (Personal Computer). With the described measuring system, angle measurements of a very great precision are achieved, in that an absolute angular measurement with an accuracy of several decimals is obtained in digital form. The computer 54 is suitably pre-programmed and provided with the information concerning the starting angle of the angle encoders, the lengths of the movable arms 22,23 and the diameter 24 of the scanning wheel, and with the use of a suitable algorithm it can display, a few seconds after the conclusion of the scanning, a precise picture of the scanned profile on the screen of the computer 54, or store the information concerning the profile in the computer, e.g. on a diskette.

In FIG. 7 is shown the computer's display screen where the curve 60 shows the scanned profile, 61 shows the standard profile for the relevant wheel, and the curve 62 shows the difference between the standard profile and the scanned profile.

The computer used is, e.g. a battery-driven PC of the Compac LTE type, or a Toshiba T1000XE or corresponding portable computer. During the use of such a computer and the measuring system disclosed and explained above, a measuring accuracy of better than ±0.05 mm and a scanning speed greater than 2000 points/sec. can be obtained. Typically, the scanning takes 2-3 secs. and, if so desired, the scanning can be shown on the screen at the same time, and the calculation work is concluded a few seconds after the scanning. The results of the scanning and the calculation are stored automatically and can be recalled for display and/or printed out on paper.

The measuring sequence is initiated by moving the arms 22, 23 so that the angle encoders 20, 21 pass through their starting point or reference point, and thus the computer knows their starting angle. Hereafter, the computer issues a clear signal, e.g. an acoustic signal, and the measuring wheel 24 is now moved, as shown in FIG. 2, over the profile of the train wheel 2 for the scanning and the registration of the profile. The starting point or reference point of the angle encoders is, of course, placed at a suitable angular position which it is natural to pass through when a measuring sequence is started.

By leading the scanning wheel 24 to the measuring gauge 13, 16, see FIG. 2, the ring thickness for the wheel is fed into the computer if the opposite end of the measuring gauge 13 has its tip 17 against the underside of the ring.

As soon as the scanning has been registered, the apparatus can be moved, either to a new place on the relevant wheel or to another wheel or item for a new scanning.

FIG. 3 shows a so-called pin gauge fixture 5 for use in measuring wheel profiles 2 for workshop use, namely when there is full access to both wheels of a wheel pair. The pin gauge fixture 5 is placed with a measuring tip 33 in contact with the one wheel, and the fixture's supporting beam 31 is placed in contact with the wheels. The measuring tip 33 sits on a movable measuring gauge 32 which also comprises a measuring point 34 for the measurement of the wheels' mutual distance. The used measuring apparatus 1 can be secured directly to the fixture 5, but can also be of the movable kind, as shown in FIGS. 1 and 2, which can be secured to the fixture magnetically or in another manner before the measurement is carried out.

In FIGS. 4 and 5 is shown another form of fixture 6 which is arranged to position and secure the scanning apparatus according to the invention during the measurement of the top profile of a rail. The supporting beam in the fixture 6 is a telescopic arm 41 which is arranged to rest on the upper side of the rail element, e.g. during the use of contact elements 42. Opposite the rail upon which the measurement is actually to be made, there is provided a contact mandrel or measuring tip 43, and at the rail 4 which is being measured there is similarly provided a contact part 44, and thus the pin gauge fixture 6 can be positioned correctly on the rail element. The scanning of the top profile of the rail can now be carried out by leading the scanning roller 24 over the top profile of the rail 4, as shown in FIG. 4, and moreover as previously shown and explained.

By using the pin gauge fixture with the opposite wheel or the opposite rail as reference, the measuring accuracy is improved and possible inaccuracies on the rear of the wheel flange will not influence the measurement. Because of the relatively large distance from the point of measurement to the opposite wheel or the opposite rail, angular errors between the stationary parts of the apparatus and the item on which the measurement is being carried out are greatly reduced when use is made of a pin gauge fixture.

I claim:

1. Apparatus for the scanning of a profile, comprising:
   a movable part being moved over and in contact with the profile;
   a stationary part supporting the movable part, wherein the movable part comprises at least one first arm and at least one second arm, said arms being coupled together at the ends by means of an electronic angle-encoding joint, in that the first arm is coupled to the stationary part via a further electronic angle-encoding joint and a free end of the second arm is brought into contact with the profile which is to be scanned, and in that the arms and the joints are coupled together in such a manner that the free end is moved in a pre-determined plane, and where the joints are coupled via an interface circuit to an electronic calculation circuit, preferably a computer; and
   wherein the free end of the second arm comprises a roller or a wheel, the first and second arms being pivoted in a plate perpendicular to an axis of the roller or the wheel.

2. Apparatus according to claim 1, wherein the roller or the wheel is made of magnetic or magnetizable material.

3. Apparatus according to claim 1, wherein the stationary part comprises means for securing the profile which is to be scanned, in that said securing means comprises at least one permanent magnet.

4. Apparatus according to claim 1, wherein the stationary part, the shiftable measuring gauge including first and second parts, the first and second parts being disposed at a predetermined distance from each other.

5. Apparatus according to claim 4, wherein the measuring gauge is shifted in the same plane as or in a plane parallel to the plane in which the second arm is moved.

6. Apparatus according to claim 5, further comprising a holder or pin gauge fixture on which the stationary part is positioned and secured, and where the holder or the pin gauge fixture comprises a member which constitutes a measuring point for distance measurement, in that the measuring point is disposed on a shiftable part with a predetermined length.

7. Apparatus for the scanning of a profile, comprising:
   a movable part being moved over and in contact with the profile;
   a stationary part supporting the movable part, wherein the movable part comprises at least one first arm and at least one second arm, said arms being coupled together at the ends by means of an electronic angle-encoding joint, in that the first arm is coupled to the stationary part via a further electronic angle-encoding joint and a free end of the second arm is brought into contact with the profile which is to be scanned, and in that the arms and the joints are coupled together in such a manner that the free end is moved in a predetermined plane, and where the joints are coupled via an interface circuit to an electronic calculation circuit;
   wherein the free end of the second arm comprises a roller or a wheel; and
   wherein the stationary part further comprises a shiftable measuring gauge, the shiftable measuring gauge includes first and second parts, the first and second parts are disposed at a predetermined distance from each other.

8. Apparatus according to claim 7, the measuring gauge is shifted in the same plane as or in a plane parallel to a predetermined plane in which the second arm is moved.

* * * * *